United States Patent
Morlet Ugalde et al.

(10) Patent No.: US 9,975,491 B2
(45) Date of Patent: May 22, 2018

(54) RETRACTABLE CARGO COVER SYSTEM

(71) Applicant: FORD GLOBAL TECHNOLOGIES, LLC, Dearborn, MI (US)

(72) Inventors: Gian Carlo Morlet Ugalde, Huixquilucan (MX); Miguel David Ferreira Orta, Toluca (MX)

(73) Assignee: Ford Global Technologies LLC, Dearborn, MI (US)

( * ) Notice: Subject to any disclaimer, the term of this patent is extended or adjusted under 35 U.S.C. 154(b) by 26 days.

(21) Appl. No.: 14/886,889

(22) Filed: Oct. 19, 2015

(65) Prior Publication Data
US 2017/0106801 A1 Apr. 20, 2017

(51) Int. Cl.
*B60Q 1/04* (2006.01)
*B60R 5/04* (2006.01)
*B60R 11/00* (2006.01)

(52) U.S. Cl.
CPC ....... *B60R 5/047* (2013.01); *B60R 2011/0012* (2013.01)

(58) Field of Classification Search
CPC ... B60R 21/06; B60R 5/047; B60R 2021/065; B60R 22/38; B60R 7/005; B60R 7/02
USPC .......... 296/37.16, 24.43, 24.4, 37.7, 76, 98; 410/100, 117, 118, 97
See application file for complete search history.

(56) References Cited

U.S. PATENT DOCUMENTS

| 3,891,263 | A | | 6/1975 | Orsulak | |
|---|---|---|---|---|---|
| 5,011,208 | A | | 4/1991 | Lewallen | |
| 5,288,122 | A | | 2/1994 | Pilhall | |
| 5,632,520 | A | * | 5/1997 | Butz | B60R 5/006 296/24.43 |
| 5,702,143 | A | * | 12/1997 | Shimazaki | B60R 21/06 160/24 |
| 5,711,568 | A | | 1/1998 | Diem et al. | |
| 5,820,187 | A | | 10/1998 | Ament et al. | |
| 6,099,222 | A | * | 8/2000 | Moore | B60R 7/005 296/37.16 |
| 6,155,621 | A | | 12/2000 | Nishida et al. | |
| 6,598,921 | B2 | | 7/2003 | Seel et al. | |
| 6,749,241 | B1 | * | 6/2004 | Erlandsson | B60R 7/005 296/24.4 |

(Continued)

FOREIGN PATENT DOCUMENTS

EP 1155923 B1 9/2008

OTHER PUBLICATIONS

"For Sale Cayenne Retractable Cargo Net for Boot Area"; http://rennlist.com/forums/porsche-cayenne-forum/774360-for-sale-cayenne-retractable-cargo-net-for-boot-area.html; Sep. 1, 2015; 6 pages.

(Continued)

*Primary Examiner* — D Glenn Dayoan
*Assistant Examiner* — Sunsurraye Westbrook
(74) *Attorney, Agent, or Firm* — Vichit Chea; King & Schickli PLLC

(57) ABSTRACT

A retractable cargo cover system is provided for a motor vehicle having three rows of seating. That retractable cargo cover system includes a first receiver carried on a second row seat, a second receiver carried on a third row seat and a retractable cargo cover assembly. The retractable cargo cover assembly may be selectively mounted in the first receiver or the second receiver as desired by the vehicle operator.

19 Claims, 7 Drawing Sheets

(56) References Cited

U.S. PATENT DOCUMENTS

| | | | | |
|---|---|---|---|---|
| 6,817,644 B2* | 11/2004 | Moore | ............... | B60R 7/005 |
| | | | | 296/24.43 |
| 6,843,518 B2* | 1/2005 | Schlecht | ............ | B60N 2/3011 |
| | | | | 280/749 |
| 7,316,440 B2 | 1/2008 | Walter et al. | | |
| 7,464,962 B2* | 12/2008 | Hakansson | ............ | B60R 21/08 |
| | | | | 280/749 |
| 7,559,593 B2* | 7/2009 | Luik | ............... | B60R 21/06 |
| | | | | 296/24.43 |
| 8,876,184 B2* | 11/2014 | Lucas | ............... | B60R 7/043 |
| | | | | 296/24.44 |
| 9,238,438 B1* | 1/2016 | Valencia Cruz | ........ | B60R 5/045 |
| 2003/0062736 A1* | 4/2003 | Ulert | ............... | B60R 5/047 |
| | | | | 296/24.43 |
| 2006/0061075 A1* | 3/2006 | Aoki | ............... | B60R 21/201 |
| | | | | 280/730.2 |
| 2013/0078049 A1* | 3/2013 | Bistuer | ............ | B60P 7/0876 |
| | | | | 410/97 |
| 2013/0087394 A1* | 4/2013 | Sanschagrin | ............ | B60K 5/00 |
| | | | | 180/54.1 |

OTHER PUBLICATIONS

"01-05 Audi A6 Cargo Net Cover Retractable Pet Luggage Partition OEM Black"; http://www.ebay.com/itm/01-05-Audi-A6-Cargo-Net-Cover-Retractable-Pet-Luggage-Partition-OEM-Black-/141651904903#vi-ilComp; Sep. 1, 2015; 8 pages.
English machine translation of EP1155923B1.

* cited by examiner

RETRACTABLE CARGO COVER SYSTEM

TECHNICAL FIELD

This document relates generally to the motor vehicle equipment field and, more particularly, to a retractable cargo cover system for a motor vehicle having three rows of seating that is specifically adapted to provide enhanced versatility and utility.

BACKGROUND

Many motor vehicles in production today provide three rows of seating. The first row at the forward end of the vehicle is for the driver and front seat passenger. The second row seating is provided in the vehicle immediately rearward of the front row seating. The third row seating for additional passengers is provided rearward of the second row seating. Typically a storage area is provided rearward of the third row seats. Such a storage area may be accessed through a lift gate or other closure at the rear of the vehicle.

In order to provide enhanced utility and the ability to carry large items or larger amounts of cargo in a convenient manner, the third row seats may be designed to fold down to form a flat or stepped floor with the cargo area. The second row seats in some vehicles may also perform the same function.

This document relates to a new and improved retractable cargo cover system of enhanced versatility and utility that is specifically adapted for use in a motor vehicle having three rows of seating. Advantageously, the retractable cargo cover system may be configured into a number of different positions suited to restrict movement of cargo being carried in the motor vehicle regardless of the position of the second and third row seats.

SUMMARY

In accordance with the purposes and benefits described herein, a retractable cargo cover system is provided for a motor vehicle having three rows of seating. That retractable cargo cover system comprises a first receiver carried on a second row seat, a second receiver carried on a third row seat and a retractable cargo cover assembly. That retractable cargo cover assembly may be selectively mounted in the first receiver or the second receiver as desired by the vehicle operator.

In one possible embodiment, the retractable cargo cover assembly includes a roll, a flexible cover wound on the roll, a retractor for winding the flexible cover onto the roll and a housing. The retractor may be a torsion spring.

In one possible embodiment, the retractable cargo cover assembly may also include an inertial locking system for locking the roll and the flexible cover in a set position in response to a vehicle impact. Further, in one possible embodiment the flexible cover may comprise a cargo net.

The first receiver may include a first set of opposed sockets. A set of opposed mounting elements may be carried on the retractable cargo cover assembly housing. At least one mounting element of the set of opposed mounting elements may be spring-loaded and biased into an extended position. Thus, when the retractable cargo cover assembly is mounted to the second row seat, the opposed mounting elements are received in the first set of opposed mounting sockets.

In one possible embodiment, the first receiver further includes a first recess extending between the first set of opposed sockets. Further, the housing of the retractable cargo cover assembly is partially nested in that first recess when the retractable cargo cover assembly is mounted to the second row seat.

In accordance with yet another aspect, the second receiver may include a second set of opposed sockets. When the retractable cargo cover assembly is mounted to the third row seat, the opposed mounting elements on the housing of the retractable cargo cover assembly are received in the second set of opposed mounting sockets of the second receiver. In one possible embodiment, the second receiver may also include a second recess extending between the second set of opposed sockets. The housing of the retractable cargo cover assembly is partially nested in this second recess when the retractable cargo cover assembly is mounted to the third row seat.

In accordance with yet another aspect, the flexible cover includes a connector on a distal end thereof. Further, the retractable cargo cover system includes multiple mounting points in the motor vehicle for cooperative engagement with that connector. Those multiple mounting points may include: (a) a first mounting point at a vehicle rearward end of the cargo area of the motor vehicle situated vehicle rearward of the third row seat, (b) a second mounting point at a roof of the motor vehicle substantially overlying the third row seat and (c) a third mounting point at the roof of the motor vehicle substantially overlying the second row seat.

In one particularly useful embodiment, the connector includes at least two hooks and the first, second and third mounting points all comprise at least one loop which may be readily engaged with the hooks. In this way, the flexible cover may be placed in a desired use position for holding cargo items in the motor vehicle and restricting movement of those items during motor vehicle operation.

In the following description, there are shown and described several preferred embodiments of the retractable cargo cover system. As it should be realized, the retractable cargo cover system is capable of other, different embodiments and its several details are capable of modification in various, obvious aspects all without departing from the retractable cargo cover system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the retractable cargo cover system and together with the description serve to explain certain principles thereof. In the drawing figures.

Figure 7A:
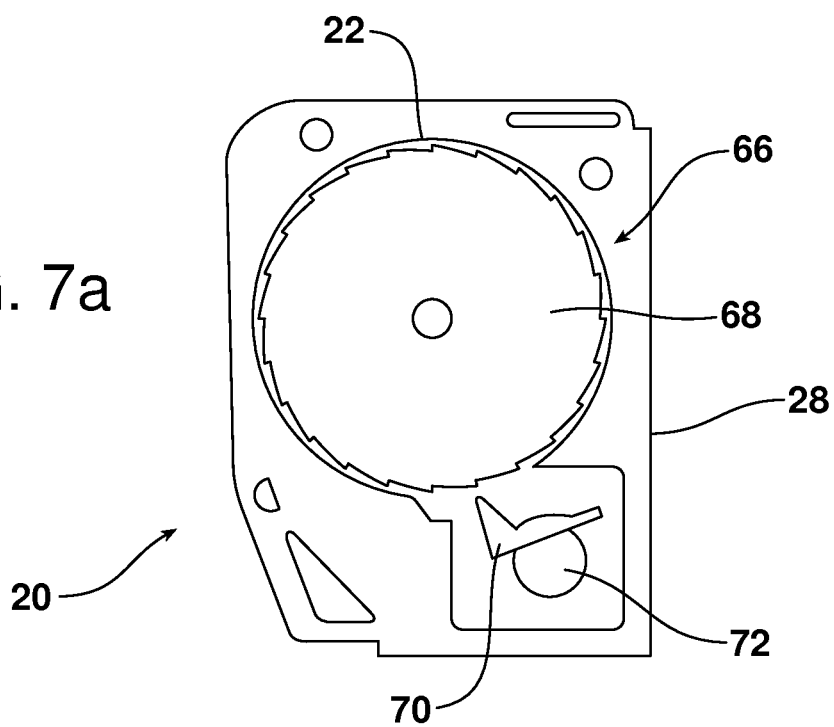
Figure 7B:
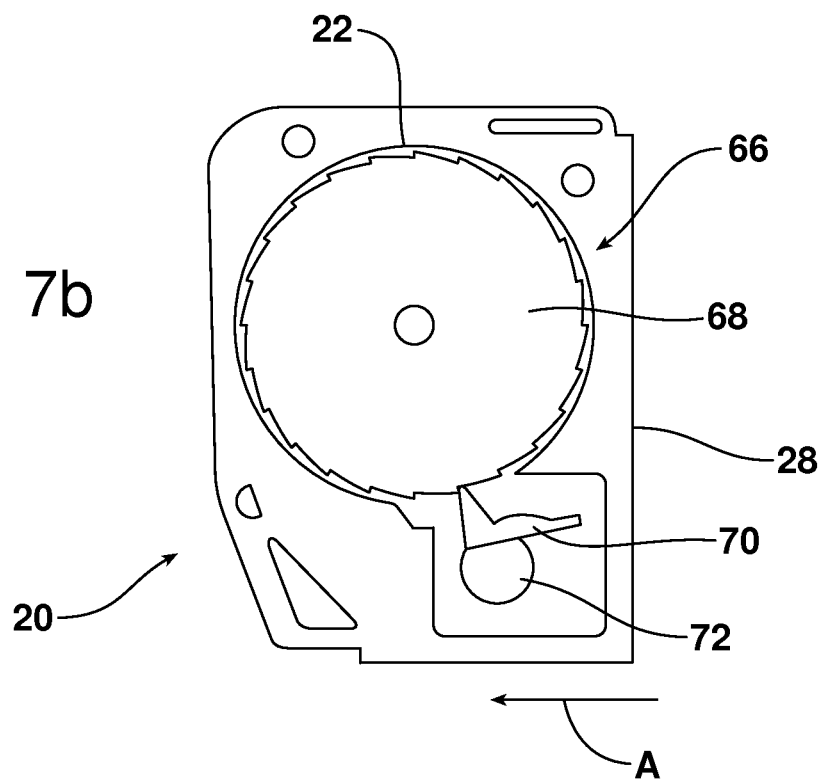

FIGS. 7a and 7b are schematic cross-sectional views illustrating the internal inertial locking mechanism for the roll upon which the flexible cover is wound. In FIG. 7a, the inertial locking mechanism is disengaged from the roll. In FIG. 7b, the inertial locking system is engaged with the roll, locking the flexible cover in place.

Reference will now be made in detail to the present preferred embodiments of the retractable cargo cover system, examples of which are illustrated in the accompanying drawing figures.

DETAILED DESCRIPTION

Figure 1:
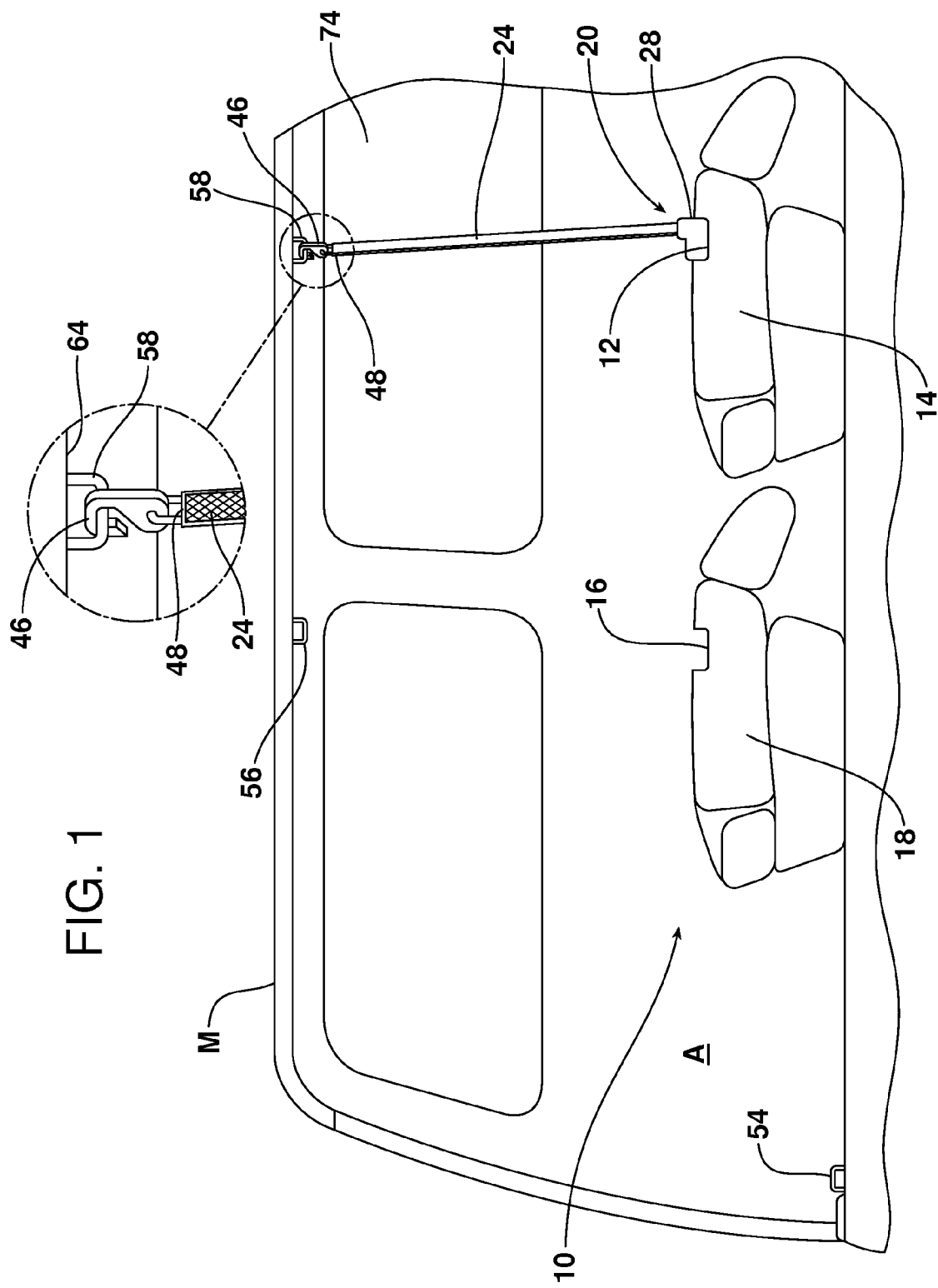
FIG. 1 is a schematic side elevational view of the retractable cargo cover system illustrating the second and third row seats of the motor vehicle in a folded down position and the flexible cover of the retractable cargo cover system in a first possible operating position.

Reference is now made to FIGS. 1-7b illustrating the retractable cargo cover system 10 for a motor vehicle M having three rows of seating (only the second and third rows of seating are illustrated in FIG. 1). That retractable cargo cover system 10 may be broadly described as including a first receiver 12 carried on a second row seat 14, a second receiver 16 carried on a third row seat 18 and a retractable cargo cover assembly 20. As should be appreciated from viewing FIGS. 1-4, the retractable cargo cover assembly 20 may be selectively mounted in either the first receiver 12 on the second row seat 14 or the second receiver 16 on the third row seat 18.

Figure 6:
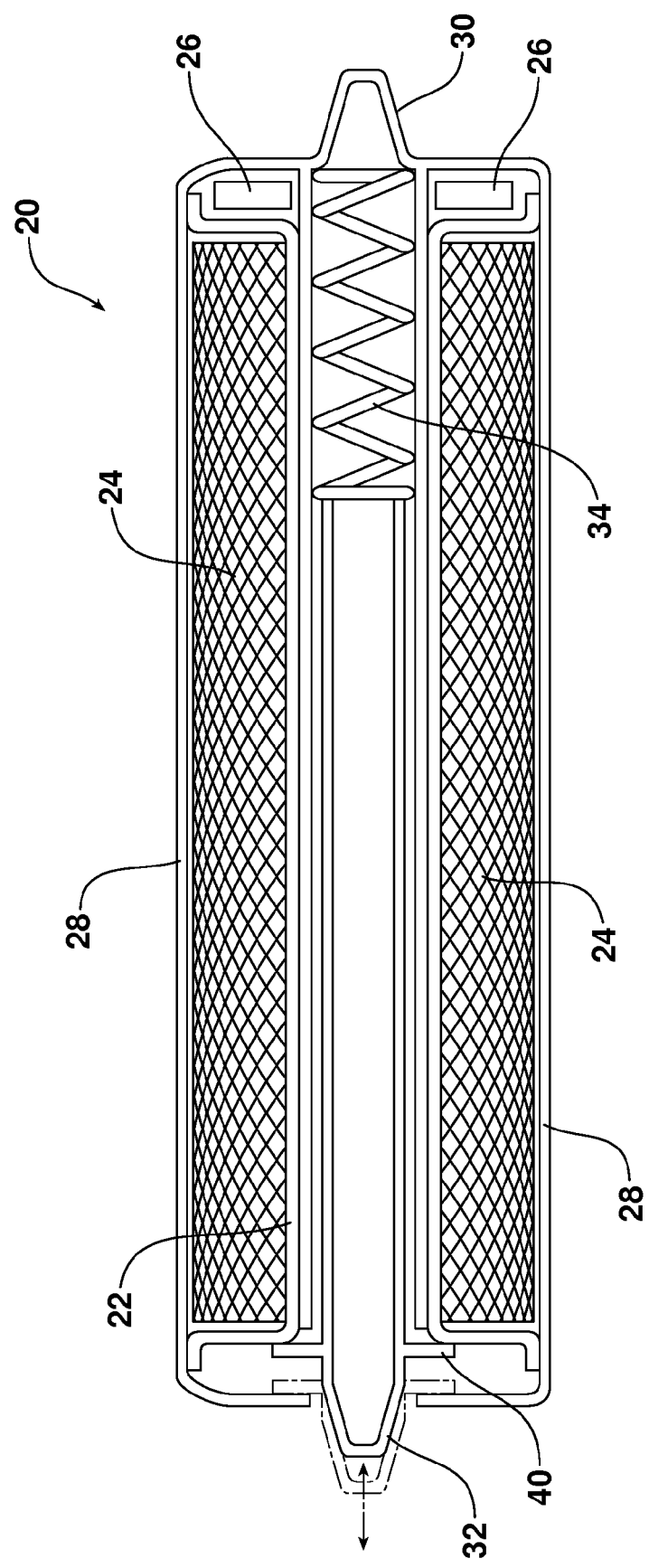
FIG. 6 is a schematic cross-sectional view illustrating the retractable cargo cover assembly including the roll retractor spring and the spring for loading the mounting element of the retractable cargo cover assembly.

As best illustrated in FIG. 6, the retractable cargo cover assembly 20 includes a roll 22, a flexible cover 24 wound on the roll, a retractor 26 for winding the flexible cover onto the roll and a housing 28. In one possible embodiment of the retractable cargo cover assembly 20, the retractor 26 comprises a torsion spring.

As further illustrated in FIG. 6, the housing 28 of the retractable cargo cover assembly 20 carries a set of opposed mounting elements 30, 32. In the illustrated embodiment, the first mounting element 30 is fixed at one end of the housing 28. In contrast, the second mounting element 32 is spring-loaded by means of a spring 34 which biases the second mounting element 32 into the extended position illustrated in FIG. 6. A stop 40 limits the extension of the element 32 from the housing 28.

As illustrated in FIG. 6, the second mounting element 32 may be displaced inwardly from the fully extended position illustrated in full line to the retracted position illustrated in phantom line. This is done to mount the retractable cargo cover assembly into the first receiver 12 on the second row seat 14 or the second receiver 16 on the third row seat 18 as desired by the vehicle operator.

Figure 5:
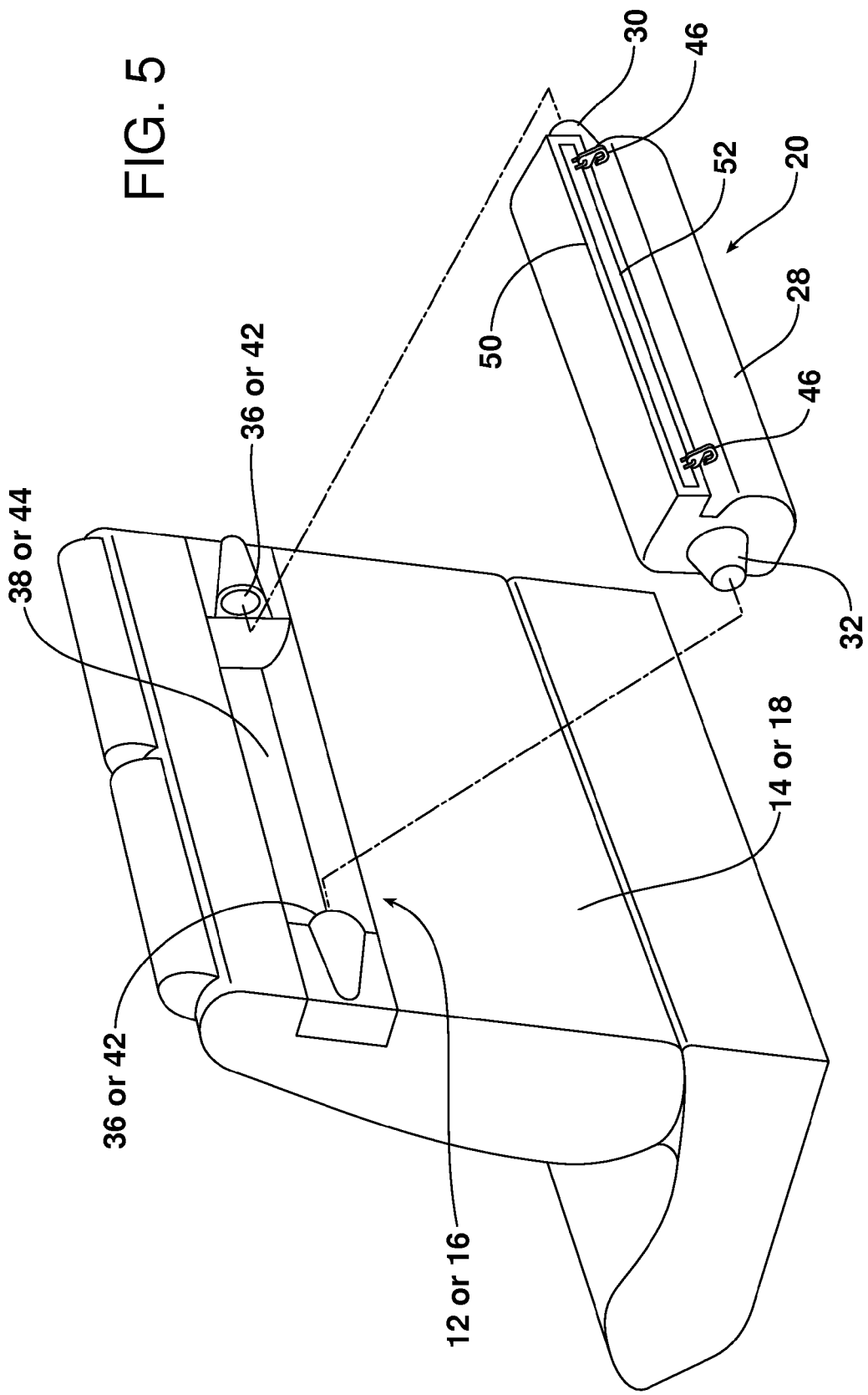
FIG. 5 is a partially exploded, detailed view illustrating the mounting of the retractable cargo cover assembly in either the first or second receiver carried on the second or third row seat.

More specifically, as illustrated in FIG. 5, the first receiver 12 on the second row seat 14 includes a first set of opposed sockets 36 and a first recess 38 extending between those sockets. When one desires to mount the retractable cargo cover assembly 20 to the second row seat 14, one inserts the fixed mounting element 30 into a first of the opposed sockets 36 and depresses the second mounting element 32 to force the second mounting element into the retracted position illustrated in phantom line in FIG. 6. The housing 28 is then pivoted on the first mounting element 30 until the housing 28 nests in the first recess 38 at which time the mounting element 32 is released. The spring 34 then biases the second mounting element 32 into the extended or full line position (see FIG. 6) wherein the second mounting element 32 is received and held in the second socket 36 opposite the first socket that holds the first mounting element 30. In this manner, the retractable cargo cover assembly 20 is easily mounted in the first receiver 12 on the second row seat 14.

Here it should be appreciated that the second receiver 16 on the third row seat 18 includes a second set of opposed sockets 42 and a second recess 44 extending between those opposed sockets. Accordingly, it should be appreciated that the retractable cargo cover assembly 20 may be easily and efficiently mounted in the second receiver 16 on the third row seat 18 in the same manner as described above when mounting the retractable cargo cover assembly into the first receiver 12 on the second row seat 14. This construction is also illustrated in FIG. 5.

When one wishes to remove the retractable cargo cover assembly 20 from either receiver 12 or 16, the operator depresses the second mounting element 32 which retracts that element from the socket 36 or 42 and allows the necessary clearance to remove the retractable cargo cover assembly 20 from the receiver in question.

The flexible cover 24 may comprise a solid sheet of fabric material that may be stretched over items I stored in the cargo area A of the motor vehicle in order to conceal those items from view as well as retain them in place during vehicle operation. Alternatively, the flexible cover 24 may comprise a cargo net as illustrated in the drawing figures.

As illustrated, the flexible cover 24 includes a connector 46 on a distal end thereof. In the illustrated embodiment, the connector 46 comprises two mounting hooks connected to the distal end 48 of the cover 24. When the cover 24 is fully retracted onto the roll 22 within the housing 28, the hooks 46 engage the margins 50 of the housing 28 around the elongated slot 52 through which the cover extends. Thus, the hooks 46 are easily accessible for engagement when one wishes to unwind the cover 24 from the roll 22.

Multiple mounting points 54, 56, 58 are provided in the motor vehicle for cooperative engagement with the connector 46. In the illustrated embodiment, the first mounting point 54 is provided at the vehicle rearward end of the cargo area A adjacent the lift gate 60. See FIGS. 3 and 4.

The second mounting point 56 may be provided at the roof 64 of the motor vehicle M substantially overlying the third row seat 18. See FIGS. 1 and 2.

The third mounting point 58 may be provided at the roof 64 of the motor vehicle M substantially overlying the second row seat 14. See FIG. 1.

In any embodiment, the first, second and third mounting points 54, 56, 58 may comprise first, second and third tie down loops as illustrated in detail in FIG. 1.

In accordance with an additional aspect, as illustrated in FIGS. 7a and 7b, the retractable cargo cover system 10 may also incorporate an inertial locking system 66. As schematically illustrated in FIGS. 7a and 7b, the inertial locking system 66 may include a locking gear 68 carried on the roll 22 and a cooperating actuator in the form of a braking claw or pawl 70 and a force sensor in the form of a displaceable ball 72. Under normal operating conditions, the pawl 70 is disengaged from the locking gear 68 as illustrated in FIG. 7a. In the event of heavy inertial loading such as would occur under braking or in the event of a vehicle impact, the force sensor or ball 72 is displaced (note action arrow A), forcing the pawl 70 into engagement with the teeth 74 of the locking gear 68 thereby locking the roll 22 and the flexible cover 24 wound thereon in position so as to hold items I in place in the cargo area A. When the inertial loading dissipates, the force sensor 72 and pawl 70 revert back into the nominal, disengaged position illustrated in FIG. 7a.

Figure 2:
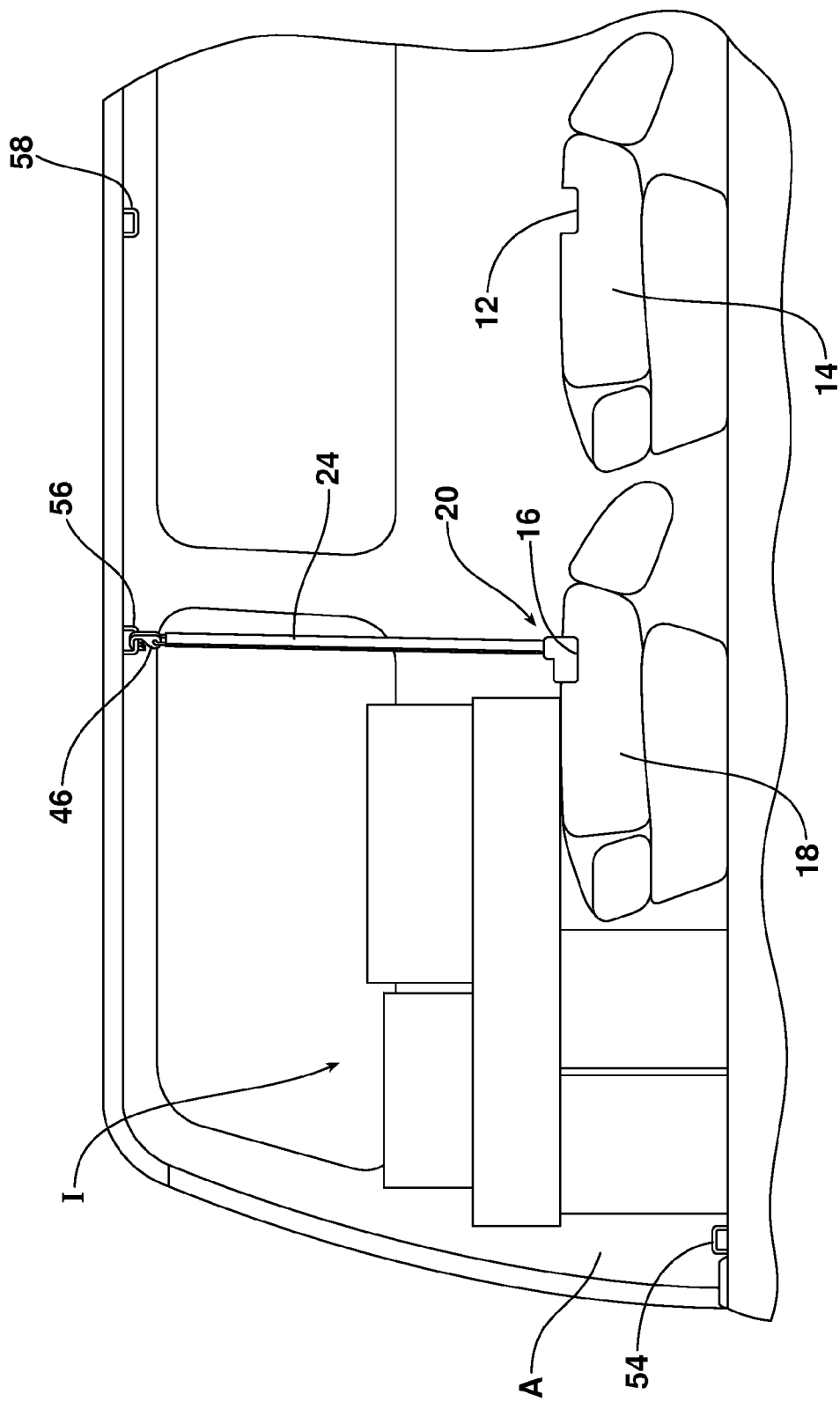
FIGS. 2-4 are similar schematic illustrations of three other operating configurations of the retractable cargo cover system.
Figure 3:
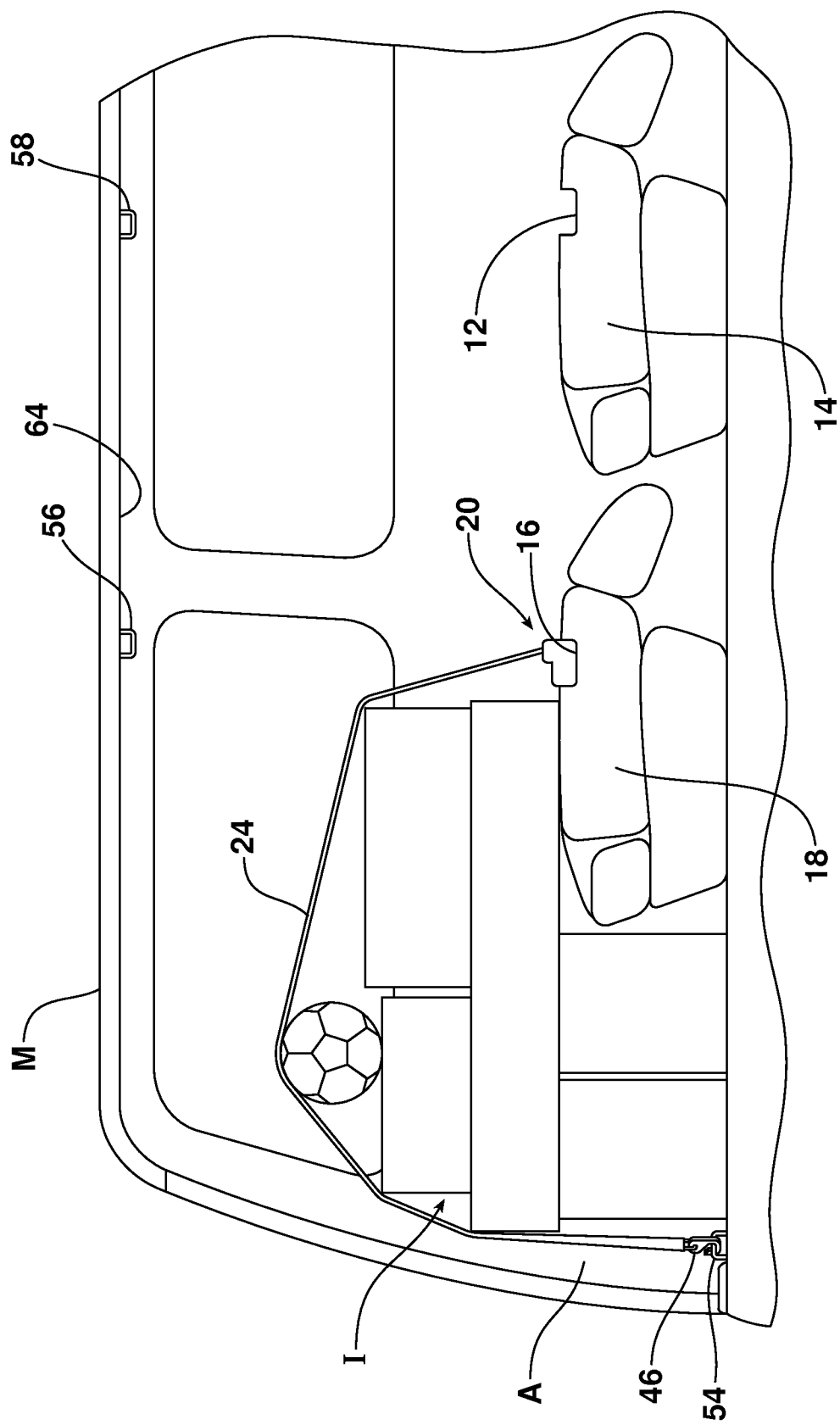
Figure 4:
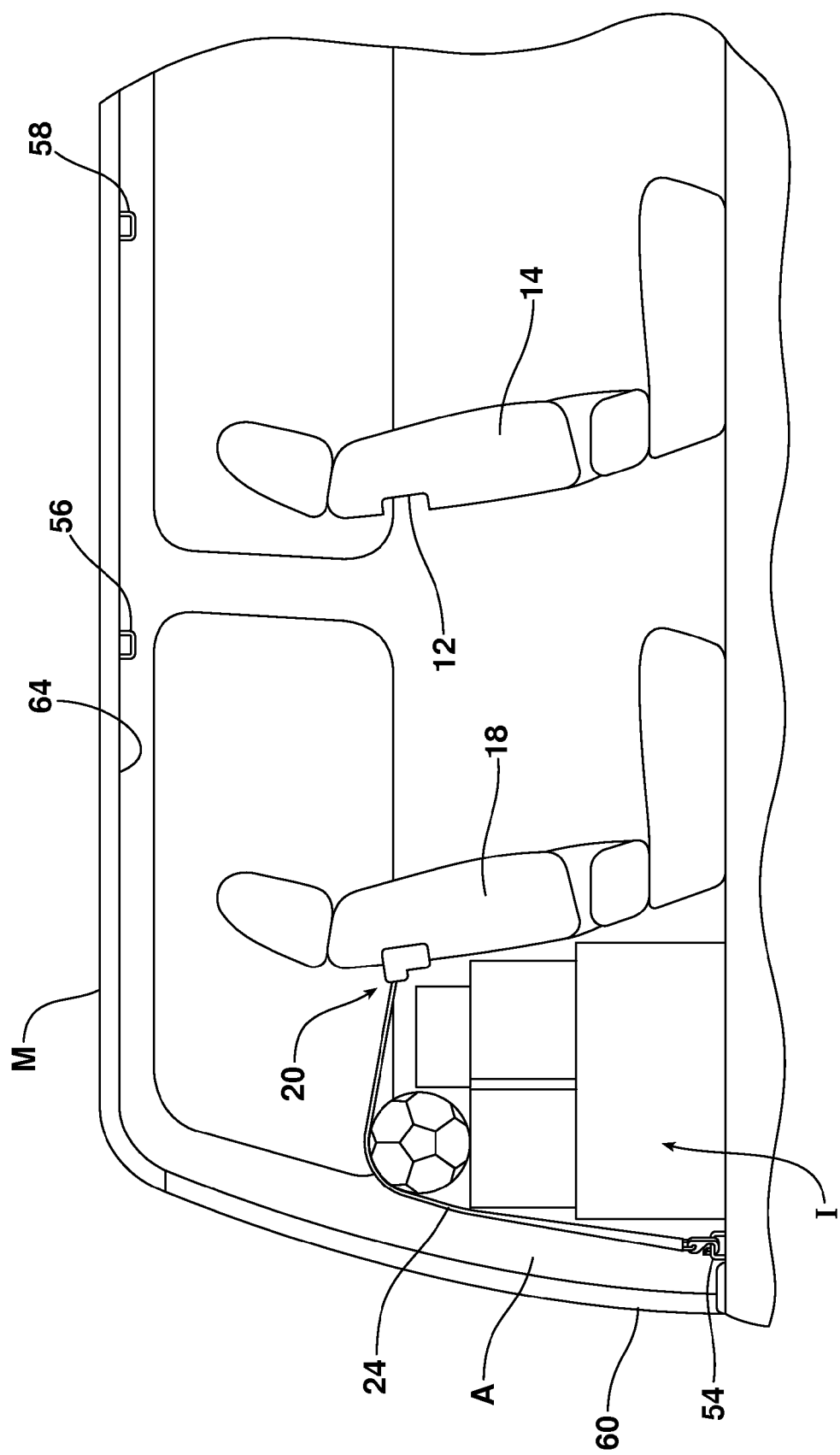

As should be appreciated from reviewing FIGS. 1-4, the retractable cargo cover system 10 is very versatile and may be configured in a number of ways to best retain cargo items I in the cargo area A whether that area is strictly behind the third row seat 18 as illustrated in FIG. 4 or that area has been partially expanded by folding down the third row seat 18 as illustrated in FIGS. 2 and 3 or fully expanded by folding down both the second row seat 14 and third row seat 18 as illustrated in FIG. 1.

As illustrated in FIG. 1, the retractable cargo cover assembly 20 is mounted in the first receiver 12 on the second row seat 14. The flexible cover 24 has been extended from the retractable cargo cover assembly housing 28 and the connector hooks 46 have been engaged with the third mounting point/loops 58 overlying the second row seat 14 to partition the enlarged cargo area A from the driver in the first row of seats (not illustrated) on the vehicle forward side 74 of the partition. Where the flexible cover 24 is made from an open netting material, the vehicle operator can still use the internal rearview mirror to see through the "partition" out the rear window of the motor vehicle M.

As illustrated in FIG. 2, the retractable cargo cover 20 may be secured in the second receiver 16 in the third row seat 18. In the FIG. 2 illustration, the flexible cover 24 has been extended from the housing 28 and the connector hooks 46 have been engaged with the second mounting point/loops 56 overlying the third row seat 18 to provide a partition between the items I stored in the storage area A behind the cover and the remaining part of the vehicle on the other side of the cover.

As illustrated in FIG. 3, the retractable cargo cover assembly 20 is held in the second receiver 16 on the third row seat 18. The third row seat 18 has been folded down and the cover 24 has been extended from the housing 28 over the items I in the storage area A with the connector hooks 46 attached to the first mounting point/loops 54 on the floor of the vehicle near the lift gate 60.

As illustrated in FIG. 4, the retractable cargo cover assembly 20 is secured in the second receiver 16 of the third row seat 18 and the seat back is in the upright position. As illustrated, the flexible cover 24 has been extended from the housing 28 over the items I in the storage area A and the connector hooks 46 have again been secured to the first mounting point/loops 54.

The foregoing has been presented for purposes of illustration and description. It is not intended to be exhaustive or to limit the embodiments to the precise form disclosed. Obvious modifications and variations are possible in light of the above teachings. For example, if desired, when the retractable cargo cover assembly 20 is mounted in the first receiver 12 on the second row seat 14, the flexible cover 24 may be extended from the housing 28 and the connector hooks 46 secured to any of the mounting points 54, 56, 58. All such modifications and variations are within the scope of the appended claims when interpreted in accordance with the breadth to which they are fairly, legally and equitably entitled.

What is claimed:

1. A retractable cargo cover system for a motor vehicle having three rows of seating, comprising:
   a first receiver carried on a second row seat, wherein said first receiver includes a first set of opposed sockets and a first recess extending between said first set of opposed sockets;
   a second receiver carried on a third row seat; and
   a retractable cargo cover assembly that may be selectively mounted on said first receiver or said second receiver.

2. The retractable cargo cover system of claim 1, wherein said retractable cargo cover assembly includes a roll, a flexible cover wound on said roll, a retractor for winding said flexible cover onto said roll and a housing.

3. The retractable cargo cover system of claim 2, wherein said retractor is a torsion spring.

4. The retractable cargo cover system of claim 2, further including an inertial locking system for locking said roll and said flexible cover in a set position in response to a vehicle impact.

5. The retractable cargo cover system of claim 2, wherein said flexible cover is a cargo net.

6. The retractable cargo cover system of claim 1, wherein said retractable cargo cover assembly includes a housing carrying a set of opposed mounting elements.

7. The retractable cargo cover system of claim 6, wherein at least one mounting element of said set of opposed mounting elements is spring-loaded and biased into an extended position.

8. The retractable cargo cover system of claim 7, wherein when said retractable cargo cover assembly is mounted to said second row seat said opposed mounting elements are received in said first set of opposed mounting sockets.

9. The retractable cargo cover system of claim 8, wherein said housing is partially nested in said first recess when said retractable cargo cover assembly is mounted to said second row seat.

10. The retractable cargo cover system of claim 8, wherein said second receiver includes a second set of opposed sockets.

11. The retractable cargo cover system of claim 10, wherein when said retractable cargo cover assembly is mounted to said third row seat said opposed mounting elements are received in said second set of opposed mounting sockets.

12. The retractable cargo cover system of claim 11, wherein said second receiver further includes a second recess extending between said second set of opposed sockets and said housing is partially nested in said second recess when said retractable cargo cover assembly is mounted to said third row seat.

13. The retractable cargo cover system of claim 12, wherein said flexible cover includes a connector on a distal end thereof.

14. The retractable cargo cover system of claim 13, further including multiple mounting points in said motor vehicle for cooperative engagement with said connector.

15. The retractable cargo cover system of claim 14, wherein said multiple mounting points includes a first mounting point at a vehicle rearward end of a cargo area of said motor vehicle situated vehicle rearward of said third row seat.

16. The retractable cargo cover system of claim 15, wherein said multiple mounting points includes a second mounting point at a roof of said motor vehicle substantially overlying said third row seat.

17. The retractable cargo cover system of claim 16, wherein said multiple mounting points includes a third mounting point at said roof of said motor vehicle substantially overlying said second row seat.

18. The retractable cargo cover system of claim 17, wherein said connector includes at least two hooks.

19. The retractable cargo cover system of claim 18, wherein said first mounting point comprises at least a first loop, said second mounting point comprises at least a second loop and said third mounting point comprises at least a third loop.

* * * * *